(12) United States Patent
Duerner

(10) Patent No.: US 9,476,484 B2
(45) Date of Patent: Oct. 25, 2016

(54) OSCILLATORY GEARBOX

(71) Applicant: Andrew Duerner, Goleta, CA (US)

(72) Inventor: Andrew Duerner, Goleta, CA (US)

( * ) Notice: Subject to any disclaimer, the term of this patent is extended or adjusted under 35 U.S.C. 154(b) by 0 days.

(21) Appl. No.: 14/932,045

(22) Filed: Nov. 4, 2015

(65) Prior Publication Data

US 2016/0131228 A1    May 12, 2016

Related U.S. Application Data

(60) Provisional application No. 62/077,048, filed on Nov. 7, 2014.

(51) Int. Cl.
*F16H 1/32* (2006.01)
*F16H 3/70* (2006.01)

(52) U.S. Cl.
CPC ...................................... *F16H 3/70* (2013.01)

(58) Field of Classification Search
CPC ............ F16H 3/70; F16H 1/32; F16H 23/00; F16H 37/02; F16H 31/00
See application file for complete search history.

(56) References Cited

U.S. PATENT DOCUMENTS

| | | | |
|---|---|---|---|
| 6,342,023 B1* | 1/2002 | Willmot | F16H 1/32 475/180 |
| 8,562,475 B2* | 10/2013 | Sato | F16H 1/32 475/178 |
| 8,678,155 B2* | 3/2014 | Kawai | F16D 41/088 192/45.017 |
| 8,684,879 B2* | 4/2014 | Nakamura | F16H 1/32 475/179 |
| 2003/0195076 A1* | 10/2003 | Ballard | F16H 1/24 475/168 |
| 2005/0059524 A1* | 3/2005 | Hori | F16H 1/32 475/180 |
| 2012/0100949 A1* | 4/2012 | Nagumo | F16H 1/32 475/149 |
| 2012/0264563 A1* | 10/2012 | Chen | F16H 1/32 475/344 |
| 2015/0316137 A1* | 11/2015 | Lannutti | F16H 55/36 474/144 |

* cited by examiner

*Primary Examiner* — David J Hlavka

(57) ABSTRACT

A gearbox apparatus comprising a base gear, output gear, center gear set, and input cam. The input cam has eccentricity to allow simultaneous gear interaction between the center gear set and the base gear, and the center gear set and the output gear. The center gear set's gear interacting with the output gear having number of teeth A. The output gear with number of teeth being B. The center gear set's gear interacting with the base gear having number of teeth C. The base gear with number of teeth being D. For gears of the same pitch the number of teeth is A–B is equal to N while C–D is also equal to N. The resultant ratio between the output gear and the input cam when the base gear is held stationary is equal a predetermined ratio of 1:(1/(A/B−C/D)).

20 Claims, 4 Drawing Sheets

DETAIL A

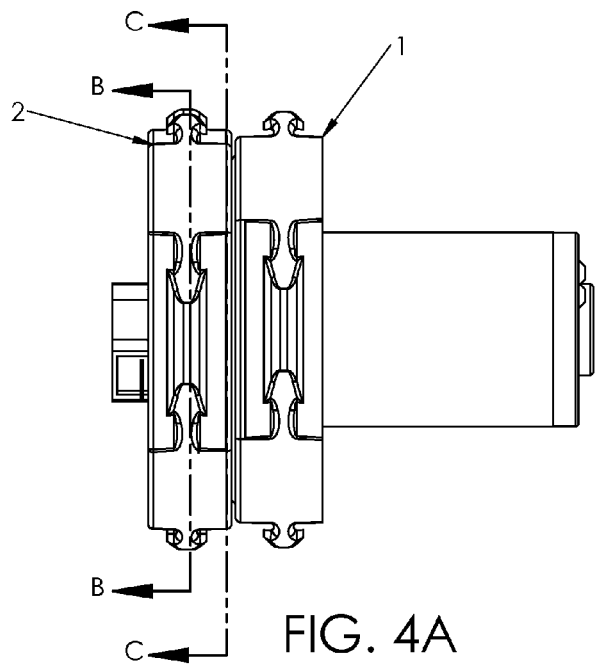
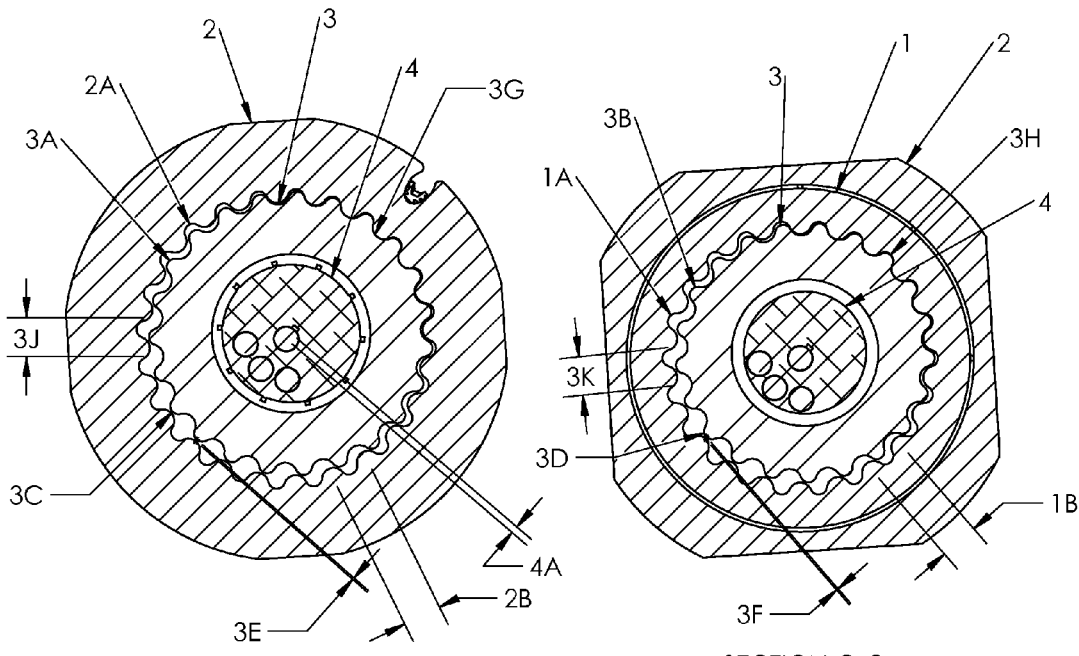

OSCILLATORY GEARBOX

BACKGROUND

There are many ways of creating high ratio compact gearboxes but they have shortcomings for many applications. High ratio gearboxes are expensive due to being difficult to fabricate and complex with many parts. Harmonic drive gearboxes such as U.S. Pat. No. 4,909,098 have expensive to produce flexible component called a "strain wave gear". Stacked planetary gearboxes such as U.S. Pat. No. 6,749,533 have many gears. Cycloidal gearboxes such as U.S. Pat. No. 5,989,144 have many rollers and gears. In general another issues with many gearboxes is their output is often a relatively small shaft, this can be difficult to attach to and requires more custom fabricated to make the gearbox useful. Gearboxes usually don't have features for mounting encoders or other sensors for gathering position information on how much the input or output of the gearbox is rotating. Gearboxes often are difficult to switch motors, either requiring major disassembly to dismount and remount a new motor or have adapters that require more parts and expanded size.

SUMMARY OF THE INVENTION:

A gearbox designed for multiple ratio configurations, utilizing compound epicyclic gearing with eccentric oscillatory motion.

DESCRIPTION OF VIEWS

Figure 1:
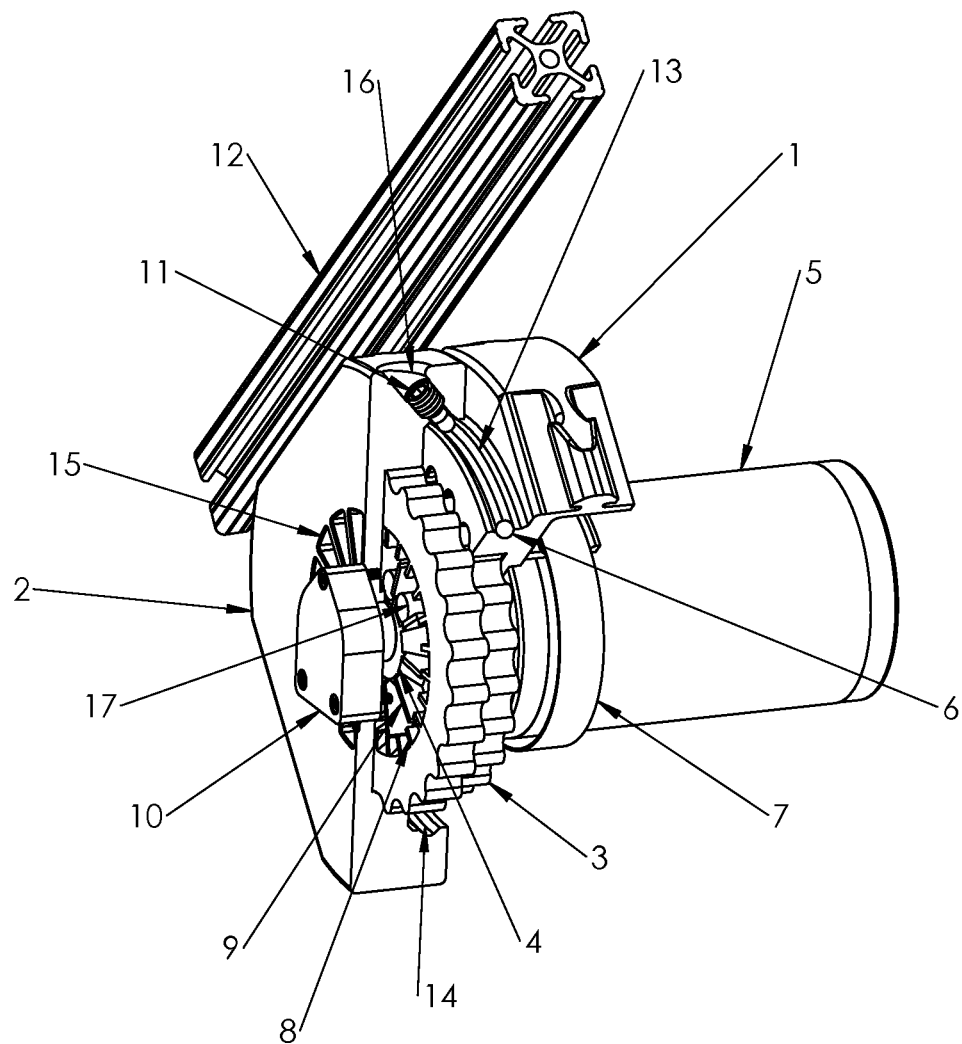

FIG. 1 A view of the gear box with multiple sections exposing critical components.

Figure 2A:
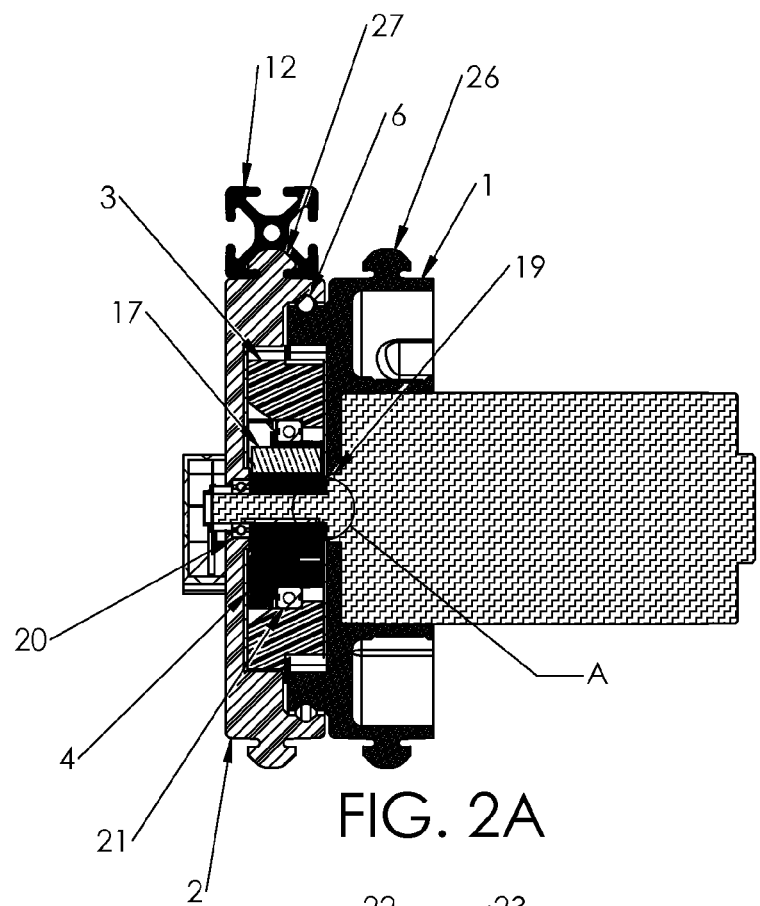

FIG. 2A A cross section view of the gearbox through the central axis of all major components.

Figure 2B:
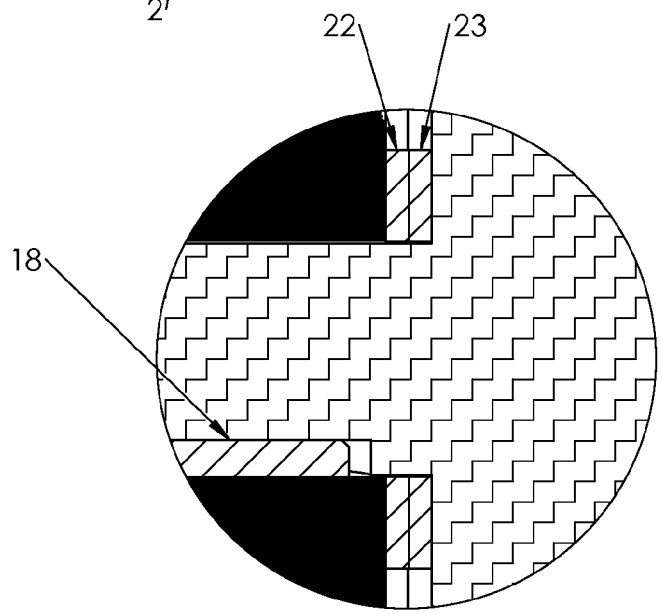

FIG. 2B An enlarged detail view of the area where a motor is interacting with the gearbox.

Figure 3:
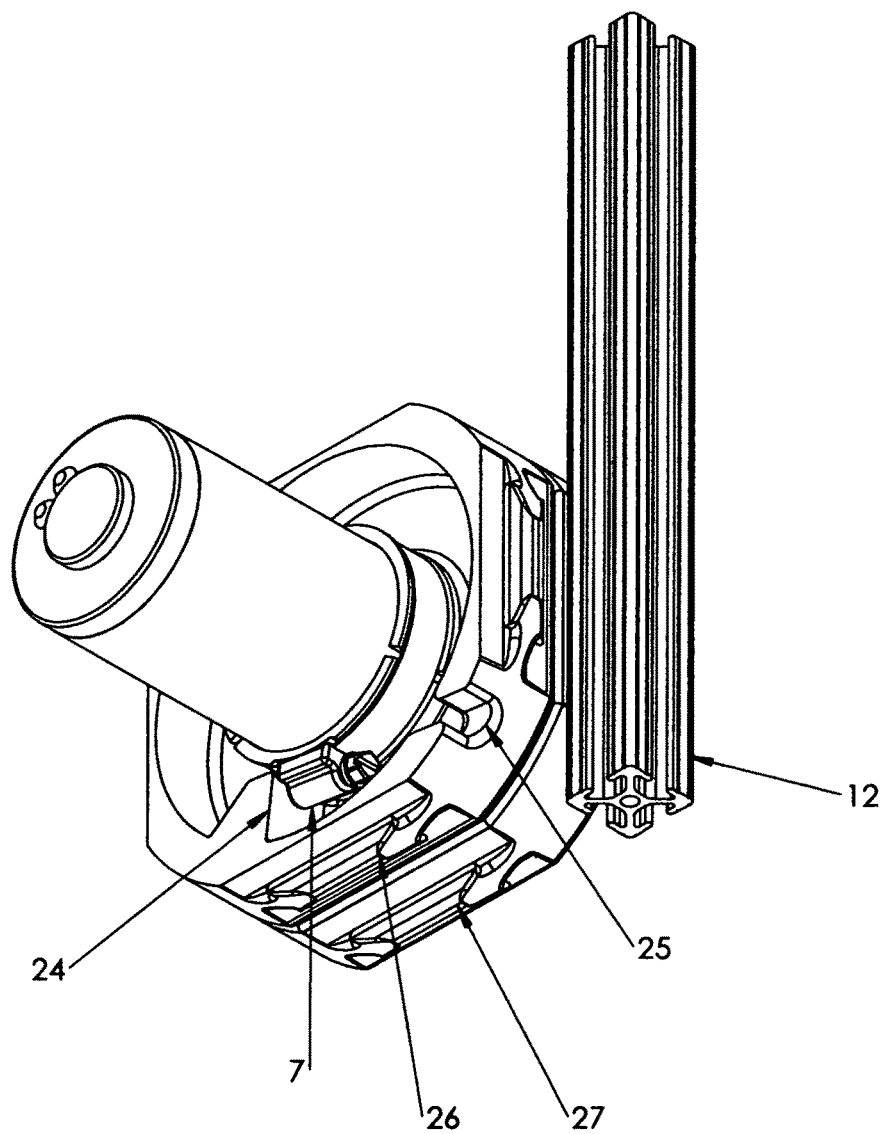

FIG. 3 A view showing an extrusion interacting with the gearbox, and the method of securing a motor to the gearbox via a clamp.

FIG. 4A A view showing where subsequent section' views are referenced from.

FIG. 4B A section view showing the interaction of the center gear set with the output gear.

FIG. 4C A section view showing the interaction of the center gear set with the base gear.

DETAILED DESCRIPTION:

Referring to FIGS. 1-3, the gearbox consists of four major parts, base 1, eccentric cam 4, center gear 3, and output 2. Other parts include counter weights 17, spacer bushings 22 & 23, bearing balls 6, bearing ball setscrew 11, eccentric bearing 21, shaft support bearing 20, compression clamp 7, motor 5, encoder 10, motor shaft key 18, T-slotted extrusion framing material 12. The gearbox's major parts can be made of various materials including many types of plastics, metals, and composites. Different manufacturing methods for those major parts include, 3D printing, injection molding, casting, machining, sintering, forging and grinding.

To reduce the number of parts and axial length of the gearbox, the center eccentric cam that drives the primary bearing is large enough diameter to contain the motor 5 drive shaft and necessary counter weights 17 to balance the eccentric cam 4, eccentric bearing 21, and center gear 3. The counter weights 17 can vary in number, length, and density to compensate for different size center gears 3 for compensating weight changes of the center gear 3 when configuring the gearbox for a different ratio. The eccentric cam 4 has a hole with a keyway slot to accept the motor 5 shaft and motor shaft key 18. The center eccentric cam 4 also may have a higher strength insert to reduce wear and have higher torque capacity when being driven by the motor 5 shaft. This insert can have a star or polygonal pattern which matches a cut out in the eccentric cam 4 so that it can be pressed in or adhered with adhesive.

The base 1 of the gearbox mounts the motor 5 with a locating hole 19 that interacts with the motor 5 locating boss. A compression clamp 7 secures the motor 5 to the base 1. This allows the motor 5 to be installed or replaced without disassembly of the gearbox. In the base 1 of the gearbox there is an access slot 25 for operate the compression damp 7. Alternatively this access slot 25 could be a through hole. Opposite the access slot 25, there is a stop feature 18 on the base 1 for counteracting the force on the compression clamp when tightening or loosening. Alternatively the motor can be mounted using screws that go through the base 1 and tighten the motor face to the base 1. This method requires disassembly of the gearbox for changing motors or for the gearbox to be initially assembled with the motor bolted to the base 1.

The output 2 has a hole for mounting the shaft support bearing 13. This shaft support bearing 13 counteracts the load caused from tooth interaction between the center gear's 3 two gears and the base 1 and output 2 gears. In other configurations the base 1 and output 2 use pins or rollers and alternatively the center gear 2 can use pins or rollers. In other designs the center gear 3 can be made up of two separate parts each with their own gear profile and bolted together, and thus creating a way of constraining the eccentric bearing 21 and being more simple to manufacture in some instances.

The base 1 has a large diameter bearing ball raceway 13 that axially and radially constrains the output. The output 2 has a mating large diameter bearing ball raceway 14 with a bearing ball input hole 16 that gets plugged by the bearing ball setscrew 11 after installation of the bearing balls 6. This allows heavy loads to be directly supported by the gearbox.

The eccentric bearing 21 being a relatively large diameter and rotating at high speeds, can get hot, so cooling fins 8 are integrated into the center gear 3 and cooling fins 9 are integrated into the eccentric cam 4. The eccentric cam 4 fins 9 also act as a fan to blow air across themselves and the center gear fins 8, drawing heat away from the eccentric bearing 14. Slots 15 are cut into output 2 to allow the heated air to leave the gearbox and cycle in cool external air.

In this configuration the base 1 and the output 2 have a T shaped profile 26 and 27 respectively on each of the four sides to accept T-slotted extrusion framing material 12. The T shaped profile 26 and 27 is located at same distance from the center of rotation, allowing for the output 2 of one gearbox to be easily connected to the base 1 of another gearbox thus allowing for multiple degree of freedom robotic arms and gimbals to be easily created. Other traditional attachment and mounting methods such as threaded holes and inserts are also considered.

The output 2 has mounting features for attaching an encoder 10 that will read the amount of angular rotation of the motor 5 shaft after a code wheel is attached. Another method of learning position information of the output 2 is to adhere a code strip to the output 2 and read it with an encoder sensor mounted to the base 1. Alternatively, another method of learning position information of the output 2 is for it to have grooves or teeth and rotate a secondary wheel or gear that is connected to an encoder that is mounted to the base 1.

Referring to FIG. 4, the base 1 has a gear pattern 31 that meshes with one side of the center gear 3, gear pattern 30. The output 2 also has a gear pattern 28 that meshes with the opposite side of the center gear 3, gear pattern 29. The achievable gearbox ratio is equal to the following formula:

Ratio=1: $(1/(A/B-C/D))$

Where A=number of teeth center gear 3 output side gear pattern 3A
Where B=number of teeth output 2 gear pattern 2A
Where C=number of teeth center gear 3 base side gear pattern 3B
Where D=number of teeth base 1 gear pattern 1A
In the instance shown, A=23, B=24, C=21, D=22

Ratio=1: $(1/(23/24-21/22))=1:264$

In the instance shown, for every turn of the input, the output will rotate by 1/264th of a rotation. A multitude of ratios are possible by changing the number of teeth of the gear patterns of the base 1, output 2, and center gear 3. Many of these different ratios will fit within the same overall size allowing for a family of interchangeable gearbox's with a variety of ratios.

For the design of the eccentric cam 4, the amount of eccentricity 4A is found by the following formula:

Eccentricity=$(B*E/2*\pi)-(A*E/2*\pi)$

Where E=desired pitch of 3J,3K,2B,1B. This instance the pitch are equal. Other iterations of the gearbox the pitch of 3J,2B, and 3K,1B may differ and resulting in an altered tooth geometry.

Where A=number of teeth center gear 3 output side gear pattern 3A
Where B=number of teeth output 2 gear pattern 2A

The same results should be found when using number of teeth center gear 3 output side gear pattern 3B and number of teeth base 1 gear pattern 1A. The eccentricity 4A can be slightly altered to account for manufacturing tolerances, desired smoothness of operation, and the total backlash of the gearbox. The pitch 3J,3K,2B,1B can be slightly altered to account for manufacturing tolerances, desired smoothness of operation, and the total backlash of the gearbox.

The radius 3C must provide clearance so that the center gear 3 can pass by the output 2 opposite the tooth interaction area 36. Enough clearance 3E is needed so that when the center gear is push away from the tooth interaction area 3G due to torque in the gearbox, the center gear 3 and the output 2 never interfere during operation.

The radius 3D must provide clearance so that the center gear 3 can pass by the base 1 opposite the tooth interaction area 3H. Enough clearance 3F is needed so that when the center gear is push away from the tooth interaction area 3H due to torque in the gearbox, the center gear 3 and the base 1 never interfere during operation.

I claim:

1. A gearbox comprising:
   a base gear, output gear, input cam, and center gear set;
      said base gear having a base gear profile comprising a row of base gear teeth the number of which being Xa, a first bearing feature for constraining the output gear for coaxial rotation relative to the said base gear profile, a second bearing feature for constraining the input cam for coaxial rotation relative to the said base gear profile;
      said output gear having an output gear profile comprising a row of output gear teeth the number of which being Xb, where Xb=Xa±Ng, where said Ng is a non zero integer number, a third bearing feature that is coaxial with the said output gear profile for being constrained by the said first bearing feature for coaxial rotation relative to the said base gear profile;
      said input cam having a forth bearing feature for being constrained by the said base gear for coaxial rotation relative to the said base gear profile, an eccentric feature that causes oscillatory motion of the said center gear set, a fifth bearing feature for constraining the said center gear set for coaxial rotation relative to the said eccentric feature;
      said center gear set having two gear profiles, a first gear profile comprising a row of center first gear teeth the number of which being Ya, where Ya=Xa−Nh, where Nh is a non zero positive integer number, having a second gear profile comprising a row of center second gear teeth the number of which being Yb, where Yb=Xb−Nh which is positioned coaxial to the said first gear profile, having a sixth bearing feature for being constrained by the said fifth bearing feature of the said input cam for coaxial rotation relative to the said eccentric feature;
      said eccentric feature has eccentricity determined by the number of said base gear teeth and the number of said center first gear teeth so they mesh together, the same said eccentricity will result in the said output gear teeth and the said center second gear teeth also will mesh together;
   rotation of the said input cam will cause the said center gear set to oscillate, this causes the said first gear profile to mesh with the said base gear profile while simultaneously the said second gear profile to mesh with the said output gear profile, the result of which causes rotation between the said base gear and said output gear, whereby transmitting rotational movement and torque according to a predetermined ratio.

2. The gearbox configuration of claim 1, wherein the said input cam driven and supported by the output shaft from a motor.

3. The gearbox configuration of claim 1, wherein the said input cam is of large enough diameter for design of counter weights to be placed inside for balanced operation.

4. The gearbox configuration of claim 2, wherein the base gear has mounting features for using a compression clamp, for securing the said motor without having to disassemble the gearbox during said motor installation.

5. The gearbox configuration of claim 4, wherein the base gear has a material removed for tool access for adjusting the said compression clamp and has a stop feature for counteracting the force from the tool used to adjust the compression clamp to keep the said compression clamp in the correct location.

6. The gearbox configuration of claim 2, wherein the base gear has a hole that locates the said motor by constraining the motor location boss.

7. The gearbox configuration of claim 1, wherein a bearing is mounted in the said output gear to support the said input cam, counter acting the load caused from tooth interaction between the said center gear set and the said base gear and said output gear.

8. The gearbox configuration of claim 2, wherein a bearing is mounted in the said output gear to support the motor output shaft, counter acting the load caused from tooth interaction between the said center gear set and the said base gear and said output gear.

9. The gearbox configuration of claim 1, wherein the said input cam has fins for creating air flow and thus removing heat from the bearing between the said input cam and said center gear set.

10. The gearbox configuration of claim 1, wherein the said output gear has vent holes for cycling hot air out of the gearbox.

11. The gearbox configuration of claim 1, wherein the sides of the said base gear and said output gear has profile features that engages with structural members for mounting.

12. The gearbox of configuration of claim 11, wherein the said profile features on the said base gear and said output gear are located at same distance from the center of rotation, allowing for the said output gear of one gearbox to be easily connected to the said base gear of a second gearbox.

13. The gearbox configuration of claim 1, wherein the said base gear and the said output gear has an integrated bearing raceway for constraining the said output gear and supporting loads attached to the said output gear.

14. The gearbox configuration of claim 1 wherein the said output gear has a mounting feature for mounting an encoder sensor that reads an encoder wheel that is attached to the said input cam.

15. The gearbox configuration of claim 1, wherein the said output gear has markings that is read by an encoder mounted to the said base gear.

16. The gearbox configuration of claim 1, wherein the said base gear teeth and said output gear teeth, are comprised of pins.

17. The gearbox configuration of claim 1, wherein the said center first gear teeth and said center second gear teeth, are comprised of pins.

18. The gearbox configuration of claim 1, wherein the said base gear teeth and said output gear teeth, are comprised of rollers.

19. The gearbox configuration of claim 1, wherein the said center first gear teeth and said center second gear teeth, are comprised of rollers.

20. The gearbox configuration of claim 1, wherein the said center gear set is composed of two separate parts, one for the said first gear profile and another for the said second gear profile, being secured together to perform the function of the said center gear set.

* * * * *